(12) United States Patent
Vasquez et al.

(10) Patent No.: US 8,837,711 B2
(45) Date of Patent: Sep. 16, 2014

(54) DYNAMIC UPDATE OF SKILLS DATABASE

(75) Inventors: Juan Vasquez, Gibsonton, FL (US);
Parind S. Poi, Lewisville, TX (US);
Mayuresh Hegde, Irving, TX (US);
Haridas Bhogade, Plant City, FL (US);
Prashant B. Desai, Land O Lakes, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 299 days.

(21) Appl. No.: 13/087,408

(22) Filed: Apr. 15, 2011

(65) Prior Publication Data

US 2012/0263293 A1  Oct. 18, 2012

(51) Int. Cl.
*H04M 3/00* (2006.01)
*H04M 5/00* (2006.01)
*H04M 3/523* (2006.01)

(52) U.S. Cl.
CPC .................................. *H04M 3/5233* (2013.01)
USPC .................................. 379/265.12; 379/265.01

(58) Field of Classification Search
USPC ............... 379/265.01, 265.05, 265.1, 265.12, 379/265.13, 266.01, 266.02
See application file for complete search history.

(56) References Cited

U.S. PATENT DOCUMENTS

| | | | | |
|---|---|---|---|---|
| 5,903,641 | A | * | 5/1999 | Tonisson .................. 379/265.12 |
| 7,228,260 | B2 | * | 6/2007 | Fujino et al. ...................... 703/6 |
| 8,046,254 | B2 | * | 10/2011 | Kosiba et al. ................. 705/7.38 |
| 2005/0043986 | A1 | * | 2/2005 | McConnell et al. ............ 705/11 |
| 2005/0220288 | A1 | * | 10/2005 | Huey ........................ 379/265.02 |
| 2008/0075268 | A1 | * | 3/2008 | Medina et al. ........... 379/265.06 |
| 2010/0111284 | A1 | * | 5/2010 | Saravanan et al. ............. 379/229 |
| 2010/0303211 | A1 | * | 12/2010 | Hartig et al. ................. 379/1.01 |

\* cited by examiner

*Primary Examiner* — Oleg Asanbayev

(57) ABSTRACT

A device may include a communication interface to receive messages, a skills database that includes a skills schedule table, and one or more processors. The one or more processors may detect an event based on one of the messages, determine whether the event satisfies a condition for changing a schedule associated with a skill of a call agent of a call center, modify the schedule in the skills schedule table when the event satisfies the condition for changing the schedule associated with the skill of the call agent, and send a request, based on the modified schedule associated with the skill of the call agent, to an automatic call distribution (ACD) device to change the skill of the call agent from a database of the ACD device.

15 Claims, 7 Drawing Sheets

| AGENT | SKILLS | SCHEDULE |
|---|---|---|
| JOHN SMITH | FRENCH 3<br>GERMAN 7<br>SPANISH 3<br>ITALIAN 3<br>ENGLISH 1 | SU: 9-12, 13-18<br>M: 14-17, 19-24<br>T: 9-12, 13-18<br>TH: 7-11, 12-16<br>F: 8-12, 13-17 |

410 — 412 — 414 — 416

| AGENT | SKILL | LEVEL | SKILL SCHEDULE | AVAIL |
|---|---|---|---|---|
| JOHN SMITH | FRENCH | 3 | SU: 13-18<br>M: 19-24<br>T: 9-12, 13-18<br>TH: 7-11<br>F: 8-12, 13-17 | NO |

420 — 422 — 424 — 426 — 428 — 429

| EVENTS/CONDITIONS | ACTIONS |
|---|---|
| NUMBER OF CALLS TO FRENCH > 1000/DAY | SCHEDULE 2 AGENTS TO HANDLE CALLS TO FRENCH |

DYNAMIC UPDATE OF SKILLS DATABASE

BACKGROUND

When a user calls a call center, the user may use dual tone multi-frequency (DTMF) tones to perform various functions, such as navigating through a menu tree to receive a service, purchasing a product, accessing information, and/or connecting to one of multiple agents attending the call center. More advanced call centers rely on speech recognition subsystems in place of or in addition to DTMF signaling to provide similar functionalities.

BRIEF DESCRIPTION OF THE DRAWINGS

FIG. 4 is a diagram of exemplary tables in the database of FIG. 3;

DETAILED DESCRIPTION

The following detailed description refers to the accompanying drawings. The same reference numbers in different drawings may identify the same or similar elements. As used herein, the terms "call forwarding" or "call routing" may include establishing a session between the calling party and a party to which the call is forwarded from the called party. In some instances, forwarding/routing may include terminating a session, if it exists, between the caller and called party. At a call center, a device may forward/route inbound calls to call center agents (e.g., sales person, technical support agent, software agent (as opposed to a person), etc.).

As described below, a system may automatically reconfigure an automatic call distribution (ACD) logic or ACD-related system. More specifically, upon detection of specific types of events, the system may automatically update one or more information bases (e.g., files, database, tables, linked lists, etc.). The system may use the information base to configure the ACD logic to associate or disassociate skills with call agents. When the ACD logic receives a call, the ACD logic may select a call center agent whose skill set matches requirements for handling the call and forward the call to the selected call center agent.

Figure 1:
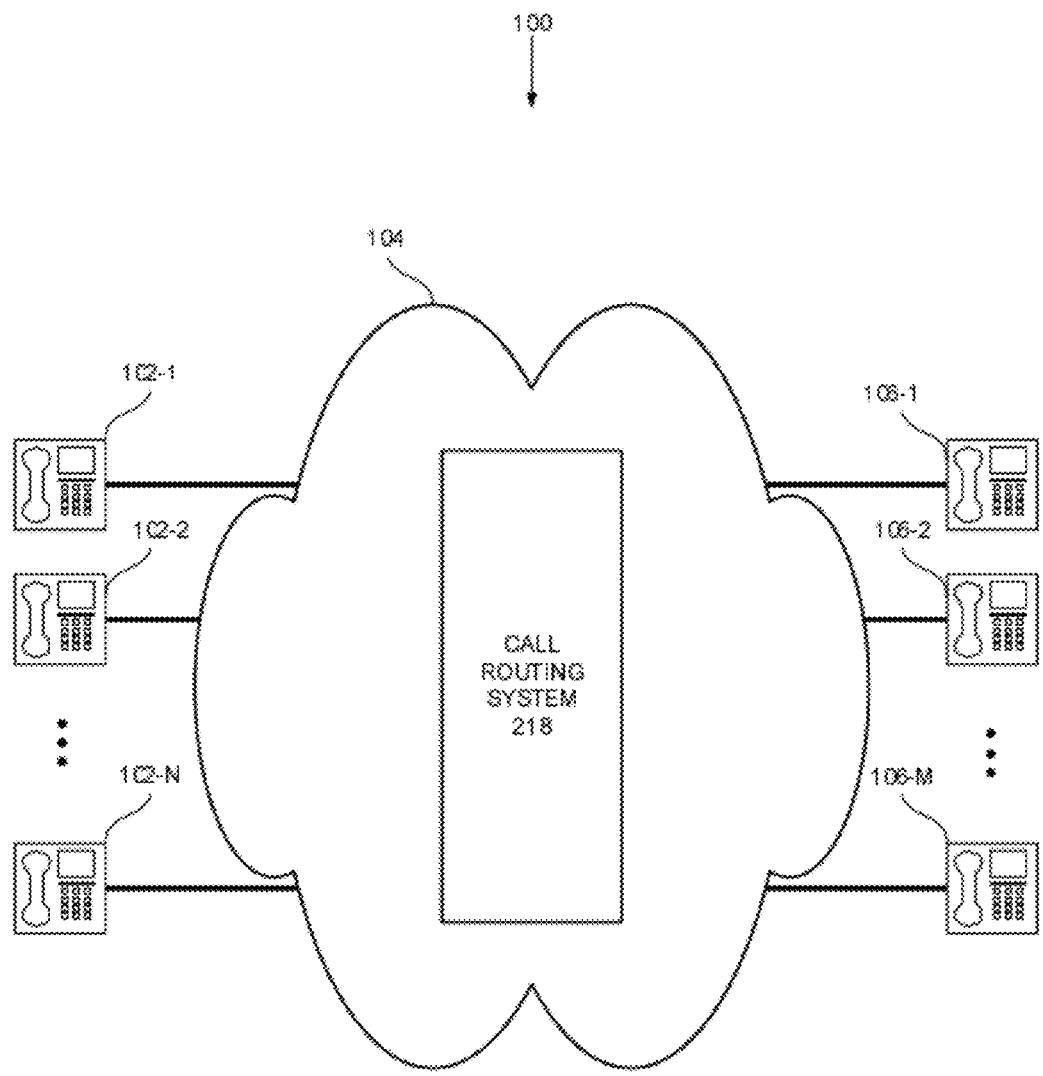
FIG. 1 illustrates an automatic call distribution (ACD) system.

FIG. 1 illustrates an automatic call distribution (ACD) system. As shown, an ACD system 100 may include caller devices 102-1 through 102-N (referred to as "caller device 102" or "caller devices 102"), a network 104 which includes call routing system 218, and call agent devices 106-1 through 106-M (individually "call agent device 106" or collectively "call agent devices 106"). Although caller devices 102 and call agent devices 106 are illustrated as telephones, in other implementations, devices 102 and 106 may include, for example, soft phones (e.g., an IP phone application installed on a computer), smart phones, etc.

Caller device 102 may call a call center that includes call routing system 218. Caller device 102 may call the call center to receive customer service, access information, purchase a product or a service, etc. Calls from caller device 102 may include a Session Initiation Protocol (SIP) calls, H.323 calls, etc. These calls may provide for different types of communications, such as telephone call (plain old telephones system (POTS) calls), videoconference calls, videophone calls, text messaging sessions, Voice-over-Internet Protocol (VoIP) calls, etc.).

Network 104 may include one or more public switched telephone networks (PSTNs) or another type of switched network (e.g., an optical network). Network 104 may also include a number of transmission towers for receiving wireless signals and forwarding the signals toward the intended destination. Network 104 may further include one or more packet switched networks, such as an Internet protocol (IP) based network, a local area network (LAN), a wide area network (WAN), a personal area network (PAN), an intranet, the Internet, or another type of network (e.g., a satellite-based network) that is capable of exchanging information.

As further shown, network 104 may include call routing system 218. In some implementations, call routing system 218 may reside in a call center or at a remote location connected to the call center over an IP network. Call routing system 218 may receive calls, park calls, guide calls through menus, and/or route (e.g., forward) the calls to available call agent devices 106. Call agent device 106 may connect to caller device 102 via call routing system 218.

Call routing system 218, in routing/forwarding calls to call agent devices 106, identifies call agents whose skills match caller requirements conveyed to call routing system 218 via various mechanisms, such as speech recognition, dual tone multi-frequency (DTMF) tones, etc. Call routing system 218 may forward the calls to the identified agents.

In call routing system 218, logic for distributing received calls (herein referred to as "ACD logic") may require frequent reconfiguration for a number of reasons. For example, a call agent may acquire a new skill, and thus, become capable of resolving new caller issues. To route calls that require the new skill to the call agent, call routing system 218 may need to reconfigure the ACD logic, to accurately reflect the call agent's knowledge base. In another example, whether a call agent should be allowed to handle a particular type of call may be impacted by the skill set of another agent. Assume that a call agent X has a skill A and skill B, and that a call agent Y with skill B is hired. If handling calls that require skill A is more important than handling calls that require skill B, the ACD logic may be reconfigured to prevent call agent X from handling calls that require skill B. In yet another example, the call routing system 218 may need to reconfigure the ACD logic in accordance with performance metrics that change over time. Assume that call agents have skill A and skill B, respectively associated with high priority calls and low priority calls. Also assume that measured average number of low priority calls whose handling requires skill B increases. To prevent too many agents from handling the low priority calls, call routing system 218 may reconfigure the ACD logic.

In each of the above scenarios, call routing system 218 may automatically configure or reconfigure the ACD logic, such that the ACD logic continues to route incoming calls in accordance with the current skills of the call agents, call agent work schedules, call priorities, call center policies, and/or other business-related rules. Without call routing system 218 automatically reconfiguring the ACD logic, an operator or an administrator may need to manually modify operating parameters of the ACD logic. For organizations with large call centers, this may necessitate significant allocation of resources.

Figure 2:
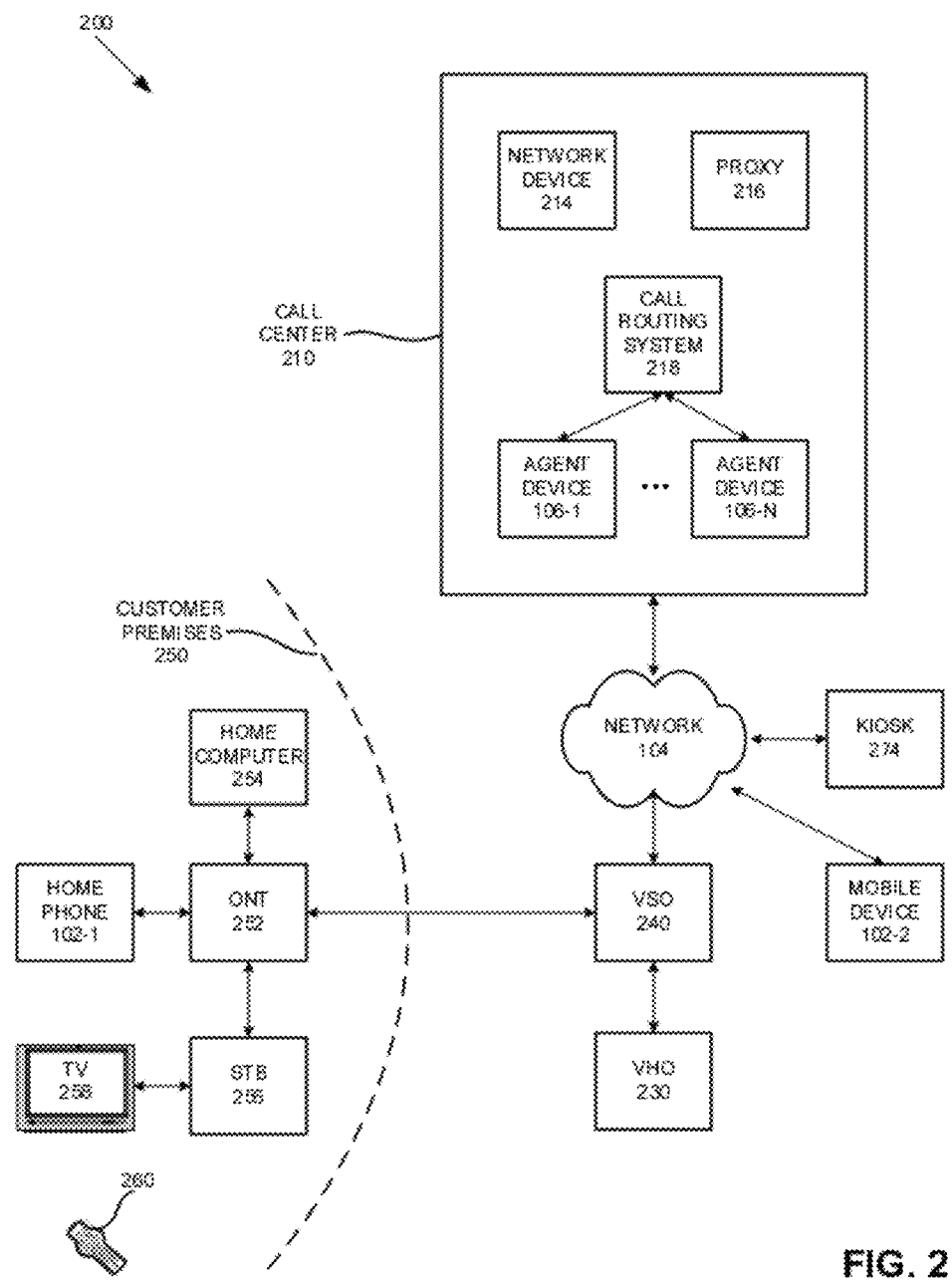
FIG. 2 is a diagram of an exemplary network in which the call routing system of FIG. 1 may be implemented.

FIG. 2 is a diagram of an exemplary network 200 in which call routing system 218 may be implemented. Network 200 may include a call center 210, a video hub office (VHO) 230, a video service office (VSO) 240, customer premises 250, a network 104, a mobile device 102-2, and a kiosk 274. Customer premises 250 (e.g., the customer's home) may include an optical network terminal (ONT) 252, a home computer 254, a set-top box (STB) 256, a TV 258, a home phone 102-1, and a remote control 260. Devices in customer premises 250, such as home computer 254, home phone 102-1, STB 256, TV 258, and remote control 260 may each be considered a "user device" or "caller device."

ONT 252 may receive data, e.g., on a fiber optic cable, and may transfer the data to the appropriate device in customer premises 250, such as computer 254 or STB 256. Likewise, ONT 252 may receive data from any device in customer premises 250 and may transmit the data to other devices in network 200, e.g., through a fiber optic cable. ONT 252 may provide customer premises 250 with Internet access, television access, or telephone service, for example.

Computer 254 may include a laptop, a desktop, a mobile telephone, a personal digital assistant (PDA), or another portable communication device. Computer 254 may include a microphone for capturing audio and/or a camera for capturing images or video. Computer 254 may also include a display for showing images or video or a speaker for playing audio.

STB 256 may receive content and output the content to TV 258 for display. STB 256 may include a component (e.g., a cable card or a software application) that plugs into a host device (e.g., a personal computer, TV 258, a stereo system, etc.) that allows the host device to display content. STB 256 may also be implemented as a home theater personal computer (HTPC), an optical disk player (e.g., digital video disk (DVD) or Blu-Ray™ disc player), a cable card, etc. STB 256 may receive commands from other devices in network 200, such as remote control 260. In one embodiment, STB 256 may include a microphone and/or a camera.

TV 258 may include speakers as well as display. TV 258 may play content, for example, received from STB 256. While some embodiments described below may use TV 258, other embodiments may use any device (e.g., computer 254 or mobile phone 102-2).

Remote control 260 may issue wired or wireless commands for controlling other electronic devices, such as TV 258 or STB 256. Remote control 260, in conjunction with STB 256, may allow a user to interact with an application running on STB 256. Other types of devices (e.g., a keyboard, a mouse, a mobile phone, etc.) may be used instead of remote control 260.

Customer premises 250 may connect to VSO 240. VSO 240 may deliver content to customer premises 250 and may receive data from customer premises 250 for forwarding to the proper destination (e.g., call center 210). VSO 240 may include a content server for transcoding and multiplexing content from different sources for delivery to customer premises 250. VSO 240, VHO 230, call center 210, and devices in network 200 may form part of a high-speed fiber optic network (e.g., FiOS™).

Mobile device 102-2 may include a radiotelephone, a personal communications system (PCS) terminal, a personal digital assistant (PDA), a laptop, or another portable communication device. Mobile device 102-2 may communicate with other devices via one or more communication towers (not shown) using a wireless communication protocol, e.g., GSM (Global System for Mobile Communications), CDMA (Code-Division Multiple Access), WCDMA (Wideband CDMA), IEEE 802.11x, etc. Mobile device 102-2 may be associated with a phone number. Like the devices in customer premises 250, mobile device 102-2 may also be considered a "user device" or "caller device."

Kiosk 274 may include one or more computers for hosting programs, such as a web browser, a database, or other applications. Kiosk 274 may include a display, a keyboard, a microphone, and a speaker. Kiosk 274 may include a handset with an integrated speaker and microphone. Kiosk 274 may be used, for example, as an automatic teller machine (ATM), a ticket machine, a calling card charging station, etc. Like the devices in customer premises 250, Kiosk 274 may also be considered a "user device."

Call center 210 may include one or more servers (e.g., "network devices") that manage and/or store information associated with providing customer service to customers. As shown in FIG. 2, call center 210 may include a network device 214, a proxy 216, call routing system 218, and call agent devices 106-1 through 106-N (collectively agent devices 106, individually agent device 106).

Network device 214 may include one or more devices that allow different data networks to communicate and cooperatively carry traffic. For example, network device 214 may adapt between SS7 signaling and session initiation protocol (SIP) signaling, H.323 protocol signaling, or other protocol signaling used by other devices in network 200. In one implementation, network device 214 may convert time division multiplexed (TDM) encoded voice signals to packetized data suitable for transport to and processing by a proxy device, such as proxy 216. Network device 214 may include a gateway that provides for compatibility at two levels, e.g., between different signaling schemes and between different media forms.

Network device 214 may also include one or more session border controllers (SBCs) that provide control of the boundary between different service provider networks, provide signaling protocol compatibility between an IP-based network and other service provider networks, or control the transport boundary between service provider networks. In one embodiment, network device 214 may correspond to an ingress point to proxy 216.

Proxy 216 may provide signaling services to establish sessions between devices, such as home phone 102-1 and a agent device 106. Proxy 216 may include a server or computer that is able to receive data from network device 214 and forward the received data to an appropriate device or system, such as call routing system 218 using a session signaling protocol, such as SIP or H.323. Proxy 216 may also receive data from call routing system 218 and forward the received data to other devices, such as network device 214, for example.

Call routing system 218 may distribute calls to one of agent devices 106. Call routing system 218 is illustrated as external from proxy 216. In some implementations, call routing system 218 may include proxy 216. Call routing system 218 may forward calls to one of agent devices 106 according to an algorithm. The algorithm may be based on which of agent devices 106 has an available customer service agent, the type of issue or problem the customer is experiencing, the skill set of the customer service agent, the experience of the customer service agent, the type of call, the type of customer, etc.

Agent device 106 may include a workstation, computer, or another type of device for a customer service agent to use for handling calls from customers. Agent device 106 may include a telephone, a camera, a microphone, a speaker, and/or a headset including a microphone and speaker. Agent device 106 may also include a software-implemented telephone (e.g., a "soft" phone) or a hardware implemented telephone (e.g., a "hard" phone). Agent device 106 may also include software or hardware for performing packet-based data transmission to transmit data such as voice, video, or text.

VHO 230 may provide on-demand content or may serve and manage interactive content (e.g., a form of content with which a user can interact). Network 104 is described above with reference to FIG. 1. In FIG. 2, network 104, in conjunction with components in VSO 240, may allow devices at customer premises 250 (e.g., a computer 254 or STB 256) to connect to other devices also attached to network 104, such as third party web site servers (not shown) or other customers (not shown).

The exemplary configuration of devices in network 200 is illustrated for simplicity. Network 200 may include more devices, fewer devices, or a different configuration of devices than illustrated in FIG. 2. For example, network 200 may include thousands or millions of customer premises. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
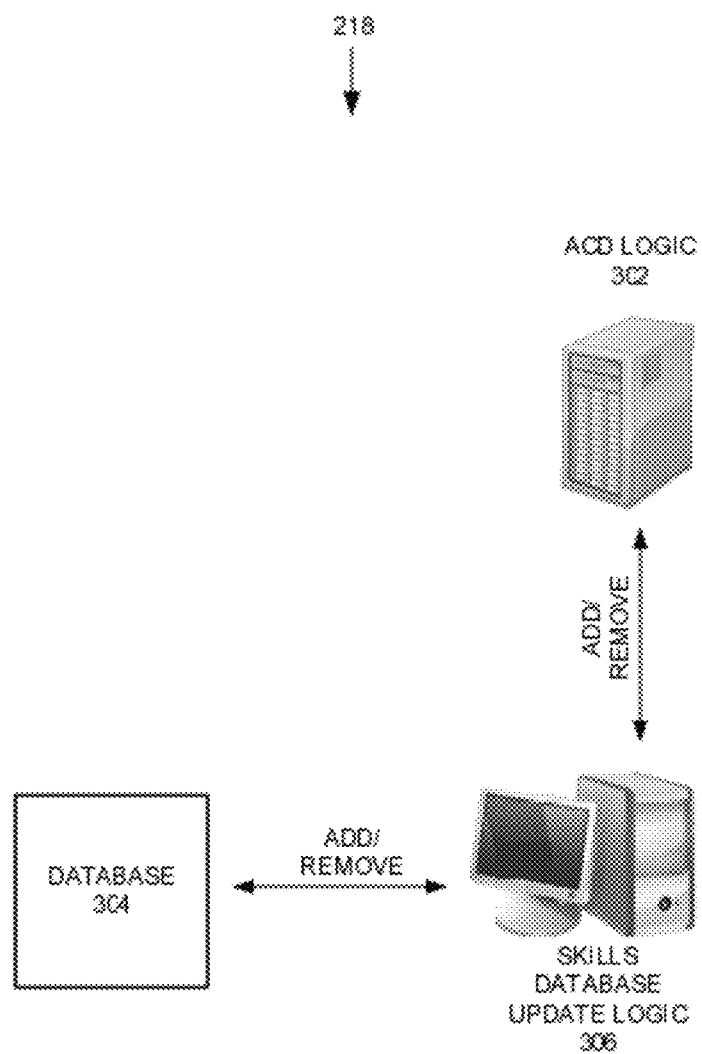
FIG. 3 is a diagram of exemplary functional components of the call routing system of FIG. 2.

FIG. 3 is a diagram of exemplary functional components or devices of call routing system 218. As shown, call routing system 218 may include ACD logic 302, database 304, and skills database update logic 306. Depending on the implementation, call routing system 218 may include additional, fewer, different or different arrangement of components than those illustrated in FIG. 3. For example, in one implementation, the devices in FIG. 3 may be implemented as one device. In other implementations, additional devices may perform the functionalities of devices 302-306.

ACD logic 302 may include software and/or hardware components to process and route incoming and outgoing calls. In some instances, ACD logic 302 may also handle calls from one internal caller to another internal caller. ACD logic 302 may distribute the calls to different groups of extensions (e.g., splits). Depending on the implementation, ACD logic 302 may report errors, call statistics, and/or other information to other devices, software entities, administrators, operators, etc.

In routing a call, ACD logic 302 may select a particular extension based on available call agents and skills associated with or required by the call. ACD logic 302 may consult with an internal database to match the call with a particular skill/agent. In addition, ACD logic 302 has the ability to update its internal database on behalf of an operator (e.g., via a client graphical user interface) or on behalf of another hardware/software component (e.g., skills database update logic 306).

Database 304 may include information about skills, call agents, what skills each call agent has (e.g., association between each call agent and different skills), call agent schedules (e.g., daily schedules, vacation days, etc.), agent skill schedules (e.g., when an agent can handle calls that require a particular skill), and/or other information that may be used to modify ACD logic 302 and ACD logic 302's internal database.

FIG. 4 is a diagram of exemplary tables in database 304. As used herein, the term "database" may include a storage device and a program for storing and retrieving information from the storage device. The program may receive structured query language (SQL) expressions as input and retrieve information that satisfy the conditions stipulated in the expressions. In some contexts, "database" may also refer to, for example, flat files that are organized for storing or looking up information based on one or more keys, a list, a linked list, hash table, an associative array, trees, and/or another type of data structure that supports lookup/retrieval of information based on one or more keys.

As shown in FIG. 4, database 304 may include agent-skills assignment table 410, agent-skill schedule table 420, and policies/business rules table 430. Agent-skills assignment table 410 may include one or more rows of a name field 412, skills field 414, and schedule field 416. Name field 412 may store/include the name of a call agent. Skills field 414 may include a list of skills and call agent's level of proficiency in the skill. Each skill may correspond to specific type of calls or problems that the call agent may receive/handle. Schedule field 416 may store the work schedule of a call agent. The schedule of the call agent may prevent a particular skill of a call agent from being scheduled (or activated) at certain times.

In some implementations, one or more users (e.g., a supervisor, administrator, operator, call agent, etc.) may modify one or more fields 412-416 via a client graphical user interface (GUI). For example, in one implementation, a call agent may modify one's own schedule via a web interface after logging into a call agent account in call routing system 218 and upon a supervisor's approval.

Agent-skill schedule table 420 may include one or more rows of a name field 422, skill field 424, level field 426, skill schedule field 428, and availability field 429. Name field 422 may store/include the name of a call agent. Skill field 424 and level field 426 may include one of the skill of a call agent and the agent's level of proficiency in the skill, respectively. Skill schedule 428 may indicate when a particular skill of the call agent may be available during work hours. Availability field 429 may indicate whether a skill of a call agent is in ACD logic 302's internal database. For example, when skills database update logic 306 adds the skill "FRENCH" to ACD logic 302's internal database, skills database update logic 306 also changes the value of availability field 429 to "yes."

Policies/business rules table 430 may include one or more rows of policies/business rules. A rule may express a call center policy or business rule regarding how many call agents may support calls that require a particular skill, at what time a call agent may receive different types of calls, which type of calls have a priority over another type of calls, etc. Each rule may include an events/conditions field 432 and actions field 434. Events/conditions field 432 may express or encode a logical or Boolean combination of conditions or events whose occurrences may be detected by skills database update logic 306. Actions field 434 may include a list of actions that skills database update logic 306 may perform when the list of conditions/events specified in events/conditions field 432 occur. In some implementations, the action in actions field 434 may pertain to modifying skill schedule 428 field.

In FIG. 4, policies/business rules table 430 includes an exemplary rule. As shown, policies/business events/conditions field 432 states "Number of calls to French>1000/day." Accordingly, when the total number of calls to be serviced by French speaking call agents exceed 1000 calls per day, event occurs, skills database update logic 306 may "schedule 2 call agents to handle" calls that require French speaking call agents, as indicated by actions field 434. In scheduling a skill of a call agent, skills database update logic 306 may modify skill schedule field 428 in agent-skill schedule table 420.

Depending on the implementation, database 304 may include different or different arrangement of tables than those illustrated in FIG. 4. For example, in one implementation, agent-skills assignment table 410 may not include call agent schedule. Agent-skills assignment table 410 may include another field, such as vacation schedule field, employee identifier field, agent's home address field, etc. In another example, agent-skill schedule table 420 may indicate core hours, for a given skill, that skills database update logic 306 may not modify without permission from a particular call agent/supervisor.

In addition, depending on the implementation, database 304 may include additional tables, such as a table of ACD-related parameters (e.g., total number of calls per day, average waiting time for calls directed to a particular call agent, average waiting time for calls directed to a skill, etc.) or fewer tables. In some implementations, a single table may include the information provided in one or more of tables 410-430. In other implementations, the information included in tables 410-430 may be distributed across additional tables, databases.

Returning to FIG. 3, skills database update logic 306 may include one or more software/hardware components that update database 304, read database 304, and reconfigure ACD logic 302 based on database 304. To update database 304, skills database update logic 306 may monitor occurrences of certain events (e.g., change of employment status of a call agent (e.g., job title, job location, etc.), change in agent skills assignment table 410 or agent-skill schedule table 420, change in work hours or vacation schedule, an occurrence of an event specified in events/conditions field 432 in policies/business rules table 430, etc.). Skills database update logic 306 may detect these events, for example, by polling or by receiving notifications from applications and/or databases (e.g., an employee database, a schedule database, database 304, etc.). Upon detecting the events, skills database update logic 306 may update database 304 based on its own internal logic or based on rules specified in policies/business rules table 430.

In addition to updating database 304, skills database update logic 306 may reconfigure ACD logic 302 based on database 304. More specifically, based on information about skills that are associated with the call agents, call agent schedules, and skills schedules, skills database update logic 306 may continually add or remove skills from lists of skills that are associated with the call agents. To add or remove a skill from an agent's list of skills in ACD logic 302, skills database update logic 306 may invoke a set of APIs (e.g., APIs for removing and adding a skill to a list of skills assigned to a call agent) exposed by ACD logic 302 via inter-process, inter-thread, or remote calls (e.g., simple object access protocol (SOAP) over hypertext transfer protocol (HTTP) calls).

In some implementations, logic for reconfiguring ACD logic 302 may be specified by policies/business rules table 430). In these implementations, events/conditions field 432 and actions field may indicate when and how ACD logic 302 is to be reconfigured, respectively. In other implementations, skills database update logic 306 may reconfigure ACD logic 302 primarily based on values of skill schedule field 428 and availability field 429 in agent-skill schedule table 420.

Figure 5:
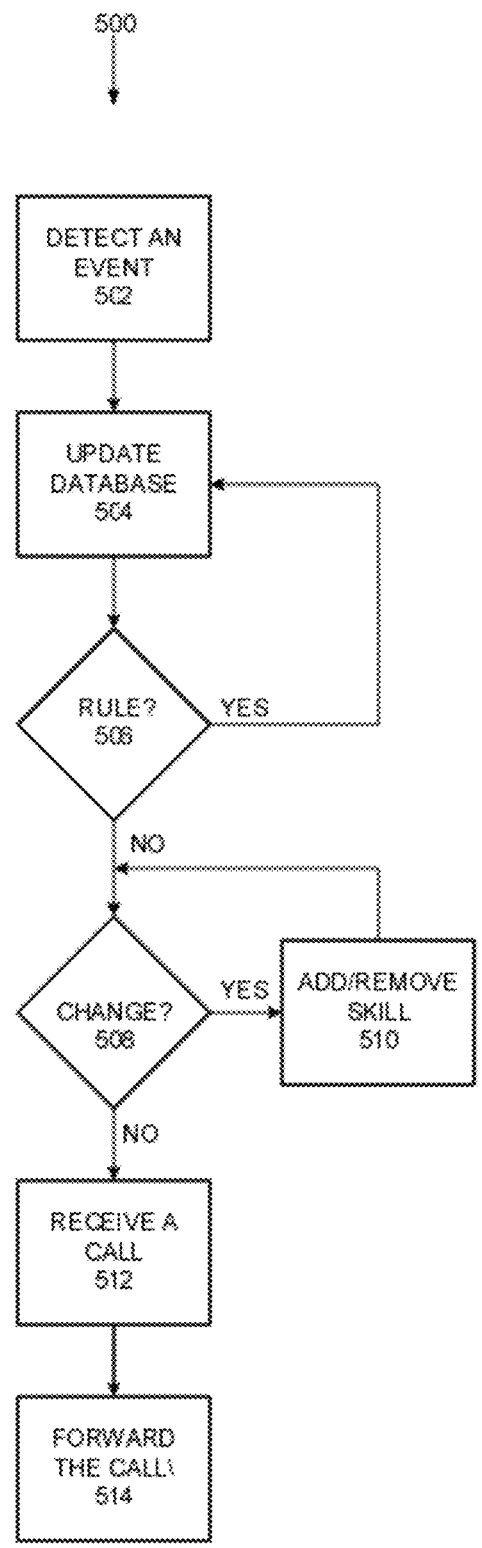
FIG. 5 is a flow diagram of an exemplary process that is associated with dynamic updating of skills database.
Figure 6:
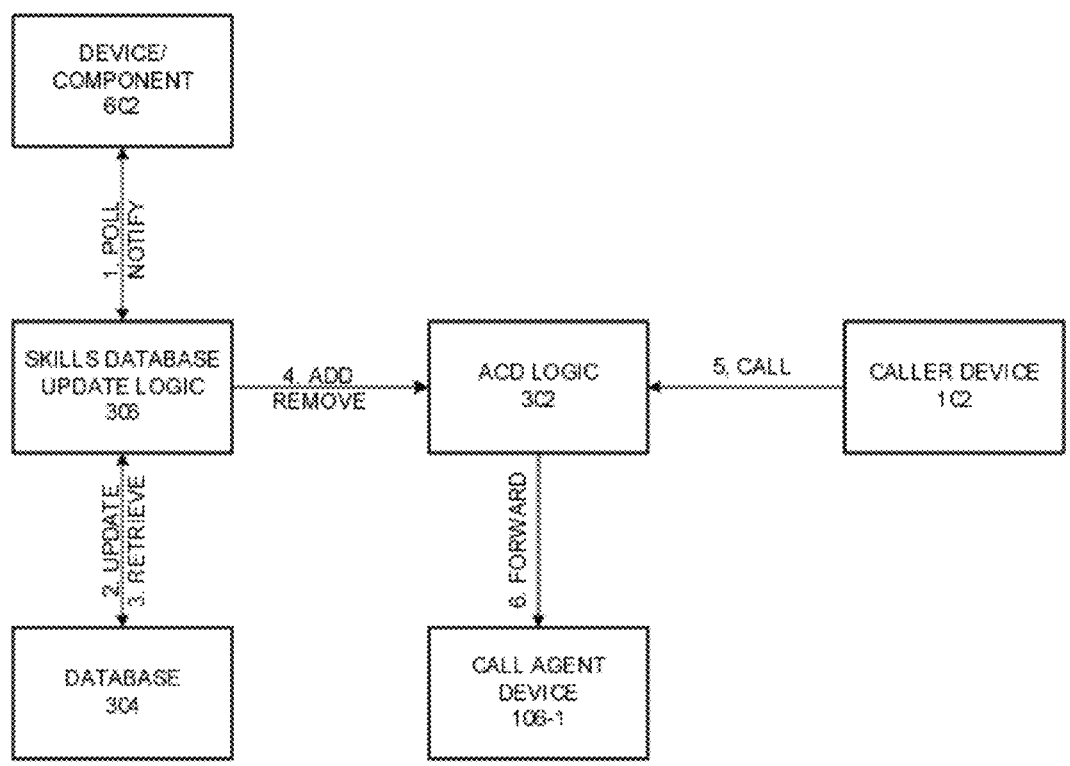
FIG. 6 is a diagram illustrating an exemplary flow of messages between the devices and components of FIGS. 1 through 3.

FIG. 5 is a flow diagram of an exemplary process 500 that is associated with dynamic updating of skills database. FIG. 6 is a diagram illustrating exemplary exchange of messages between the devices and components depicted in FIGS. 1 through 3 during process 500.

As shown in FIG. 5, process 500 may include detecting an event (block 502). FIG. 6 shows skills database update logic 306 detecting the event by, for example, polling a device/component 602 or by being notified (e.g., via a message) by device/component 602. More specifically, for example, skills database update logic 306 may query databases that track employment status, employee schedules (e.g., a calendar), database 304 or another database that tracks skill sets of an employee, etc. In another example, skills database update logic 306 may receive messages, notifications, or remote calls (e.g., Java remote method invocations (Java RMI), remote procedure calls (RPC), SOAP calls over HTTP, etc.).

The event detected by skills database update logic 306 may include, for example, as described above, a change in the skill set of a call agent, a change in the level of a skill of the call agent, a change in a call agent's schedule, a change in employment status (e.g., newly hired, terminated, transferred, promoted, etc.), updates to measured ACD parameters (e.g., volume of calls routed to a split), occurrences of events/conditions specified in events/conditions field 432 of policies/business rules 430 table, etc.

Skills database update logic 306 may detect a change in the skill set of a call agent or the level of a skill of the call agent, for example, when the call agent earns a certificate (e.g., a certificate for professional skill), earns a degree (e.g., degree in French, computer science, etc.), learns new set of skills, etc. and updates agent-skills assignment table 410 (e.g., with a supervisor's approval), updates an employee database, etc. When skills database update logic 306 polls database 304, skills database update logic 306 may detect the change in the call agent's skill set.

Skills database update logic 306 may also detect a change in call agent's schedule. For example, a call center may maintain call agents' schedules on an electronic calendar (e.g., for assigning different shifts) or agent-skills assignment table 410. Accordingly, skills database update logic 306 may query the calendar and/or agent-skills assignment table 410 to obtain the latest schedules. In some instances, a calendar program may send notifications to skills database update logic 306.

Skills database update logic 306 may also detect a change in employment status (e.g., newly hired, terminated, transferred, promoted, etc.). For example, an organization that includes the call center may have a database of employees, including call agents. Skills database update logic 306 may query the database to detect changes in employment status of call agents.

Skills database update logic 306 may detect updates to measured ACD parameters. The data may include information about call agents (e.g., agent states), about the call queue for a skill (e.g., the number of calls received, terminated, extended, etc.), the total workload (e.g., number of calls), distribution, total calls, etc. Skills database update logic 306 may query ADC logic 302 for the data.

Skills database update logic 306 may also detect occurrences of events/conditions specified in events/conditions field 432 of policies/business rules table 430. As described above, each rule in policies/business rules table 430 may include events/conditions field 432, which in turn expresses a logical/Boolean combination of conditions or events. Periodically or at scheduled times, skills database update logic 306 may determine, for each rule in policies/business rules table 430, whether the conditions in events/conditions field 432 are/have satisfied/occurred.

Skills database update logic 306 may update database 304 (block 504). FIG. 6 illustrates skills database update logic 306 updating database 306. Depending on the type of event detected at block 502, skills database update logic 306 may perform different types of processing, steps, or acts to update database 304. For example, when a call agent acquires a new skill, skills database update logic 306 may update agent-skills assignment table 410.

Skills database update logic 306 may determine whether detected event(s) triggers any of policies or rules in policies/business rules table 430 (block 506). For example, when a table in database 304 changes, skills database update logic 306 may determine whether the change may trigger any of the rules in policies/business rules 430 database.

To illustrate, assume that there are five call agents in a call center X that handles two types of calls, A and B, that require two skills, C and D, respectively. Assume that call agent John with skill D acquires new skill C; that a call center policy dictates that at least two call agents with skill C be available at all times; and that a rule E in table 430 includes "a change in agent-skill assignment table 410" and "modify skill D schedule for the call agent," as values in events/conditions field 432 and actions field 434, respectively.

In this scenario, when agent-skill assignment table 410 is updated to reflect John's new skill C, skills database update logic 306 may determine whether any of the rules in policies/business rules database 430 is triggered, by evaluating the value of events/conditions fields 432 in the rules. Upon evaluating "change in agent-skill assignment table 410" in events/conditions field 432 has occurred, skill database update logic 306 may determine that the conditions of rule E are satisfied.

If skill database update logic 306 determines whether the conditions specified in events/conditions field 432 of a rule are satisfied (block 506: yes), skill database update logic 306 may return to block 504, to further update database 304 in accordance with actions field 434 of the rule. Continuing with the prior example, further assume that three of the five call agents in call center X are unavailable between 9:00 a.m. and 5:00 p.m. on week days. In this scenario, skills database update logic 306 may modify skill schedule field 428 of agent-skill schedule table 420, for skill D for John, to indicate that skill D is not available for John between 9:00 a.m. and 5:00 p.m. This may satisfy the call center policy that at least two call agents with skill C be available at all times.

In different implementations and cases, updating database 304 itself may result in further updates to database 304 (e.g., creating a new skill in skills field 414 of agent-skills assignment table 410 entry, creating a new agent-skills assignment table 410 entry, modifying skill schedule field 428 of agent-skill schedule table 420, etc.).

If none of the conditions in events/conditions fields 432 in policies/business rules table 430 are satisfied (block 506: no), skills database update logic 306 may proceed to perform other functions, steps, or sub-processes, such as, for example, updating ACD logic 302 in accordance with agent-skill schedule table 420.

Updating ACD logic 302 may include determining, by skill database update logic 306, based on a schedule of a skill (for a particular skill and an agent) in agent-skill schedule table 420 and the skill's current availability in ACD logic 302's internal database (as indicated by availability field 429), whether a skill of the agent should be currently available to handle calls and whether the skill is available at ACD logic 302. For example, in FIG. 4, a skill in agent-skill schedule table 420 is FRENCH, and the skill's schedule includes SU13:00-18:00. If the current date and time is Sunday, 2:00 p.m., the skill should be available to ACD logic 302 (e.g., for routing calls that require FRENCH). In addition, availability field 429 shows the value NO, indicating that the FRENCH for John Smith is not currently available.

If the skill should be available but is currently unavailable (or alternatively, should be unavailable but is available) (block 508: yes), skills database update logic 306 may invoke the add/remove API of ACD logic 302, to change the skill's availability, consistent with the schedule (block 510). FIG. 6 shows skills database update logic 306 retrieving schedules of agent-skills from database 304, and invoking the add/remove APIs for ACD logic 302. After block 510, skills database update logic 306 may modify the value of availability field 429 and return to block 508, to process another entry in agent-skill schedule table 420. If none of the entries (in agent-skill schedule table 420) is inconsistent with the current state of agent skills, skills database update logic 306 may proceed to other functions and/or processes.

Process 500 may include other steps, acts, or sub-processes, such as acts that are performed by ACD logic 302. For example, as shown in FIG. 5, process 500 may include ACD logic 302 receiving a call (block 512). Based on ACD logic 302's own internal skills database, which may be updated at block 510, ACD logic 302 may route or forward a call to a particular call agent. If a skill has been removed from the list of skills of a call agent, ACD logic 302 will not route a call to the call agent. FIG. 6 illustrates ACD logic 302 receiving a call from caller device 102 and forwarding the call to an appropriate call agent whose skill is available.

Depending on the implementation of ACD logic 302, process 500 may be implemented differently than that illustrated in FIG. 5 or described above. For example, in one implementation, skills database update logic 306 may invoke the add/remove API independent of values in availability field 429 in database 304.

Figure 7:
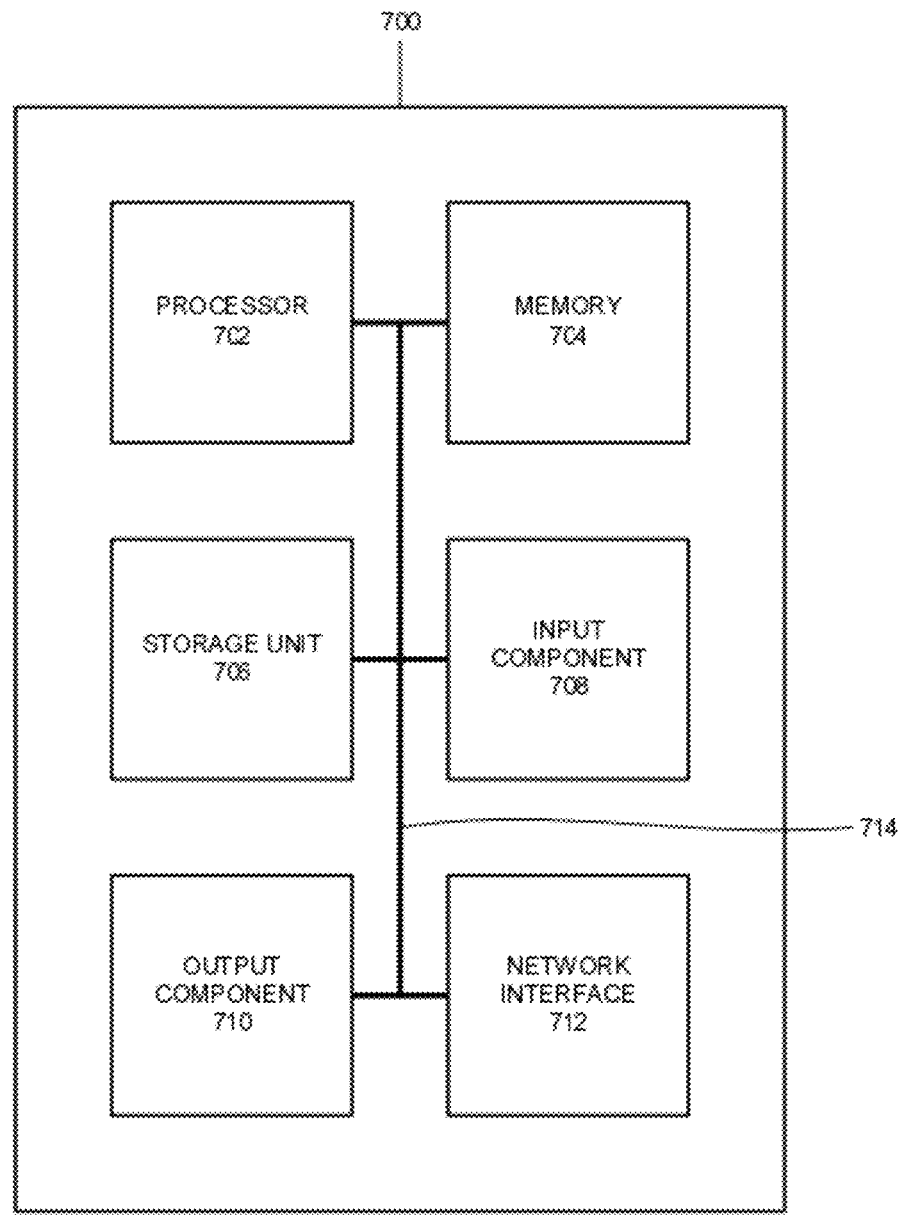
FIG. 7 is a block diagram of exemplary components of a network device of FIGS. 1 through 3.

FIG. 7 is a block diagram of an exemplary network device 700, which may correspond to one or more of devices 102, 106, and 214-274. As shown, device 700 may include a processor 702, memory 704, storage unit 706, input component 708, output component 710, network interface 712, and communication path 714. In different implementations, device 700 may include additional, fewer, different, or different arrangement of components than the ones illustrated in FIG. 7. For example, device 700 may include line cards for connecting to external buses.

Processor 702 may include a processor, a microprocessor, an Application Specific Integrated Circuit (ASIC), a Field Programmable Gate Array (FPGA), and/or other processing logic (e.g., embedded devices) capable of controlling device 700. Memory 704 may include static memory, such as read only memory (ROM), and/or dynamic memory, such as random access memory (RAM), or onboard cache, for storing data and machine-readable instructions (e.g., programs, scripts, etc.). Storage unit 706 may include a floppy disk, CD ROM, CD read/write (R/W) disc, and/or flash memory, as well as other types of storage devices (e.g., hard disk drive) for storing data and/or machine-readable instructions (e.g., a program, script, etc.).

Input component 708 and output component 710 may provide input and output from/to a user to/from device 700. Input/output components 708 and 710 may include a display screen, a keyboard, a mouse, a speaker, a microphone, a camera, a DVD reader, Universal Serial Bus (USB) lines, and/or other types of components for converting physical events or phenomena to and/or from signals that pertain to device 700.

Network interface 712 may include a transceiver (e.g., a transmitter and a receiver) for device 700 to communicate with other devices and/or systems. For example, via network interface 712, device 700 may communicate over a network, such as the Internet, an intranet, a terrestrial wireless network (e.g., a WLAN, WiFi, WiMax, etc.), a satellite-based network, optical network, etc. Network interface 712 may include a modem, an Ethernet interface to a LAN, and/or an interface/connection for connecting device 700 to other devices (e.g., a Bluetooth interface).

Communication path 714 may provide an interface through which components of device 700 can communicate with one another.

In the above description, call routing system 218 automatically reconfigures ACD logic 302. To reconfigure ACD logic 302, upon detection of specific types of events, call routing system 218 may automatically update one or more information bases (e.g., files, database, tables, linked lists, etc.). Furthermore, call routing system 218 may use the information base to add or remove skill of a call agent from the internal database of ACD logic 302. When ACD logic 302 receives a call, ACD logic 302 may select a call center agent whose skill set matches requirements for handling the call and forward the call to the selected agent.

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to an exemplary process illustrated in FIG. 5, the order of the blocks may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software. No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    detecting an event;
    determining, by a device, whether the event satisfies a condition for changing a schedule associated with a particular skill of an agent of a call center, by evaluating a policy or a rule that specifies conditions and actions;
    updating, by the device, the schedule in a skills database in response to determining by the device that the event satisfies the condition for changing the schedule associated with the particular skill of the agent of the call center;
    sending a message, based on the updated schedule associated with the particular skill of the agent, to an automatic call distribution (ACD) device to add the particular skill of the agent to a list of skills, of the agent, in the ACD device or remove the particular skill of the agent from the list of skills, of the agent, in the ACD device;
    recording, in the skills database, whether the particular skill of the agent is available to the ACD device;
    receiving, by the ACD device, a call that requires the particular skill for handling the call during scheduled times of the particular skill of the agent;
    selecting, by the ACD device, the agent to handle the call based on the particular skill of the agent; and
    forwarding the call to the agent,
    wherein the list of skills is in a database of the ACD device;
    wherein the event includes a change in employment status of the agent;
    wherein the condition includes one of:
        a promotion of the agent;
        a termination of the agent;
        an employment of the agent; and
        a transfer of the agent from one department to another department;
    wherein detecting the event includes at least one of:
        polling another device or component to detect the event; and
        receiving a notification of the event from the other device or component, and
    wherein the schedule in the skills database includes for each skill of the list of skills of the agent, times at which the each skill is available for calls to the call center.

2. The method of claim 1, wherein sending the message includes:
    invoking an application programming interface (API) for adding the particular skill to the list of skills of the agent.

3. The method of claim 2, wherein invoking the API includes:
    sending a simple object access protocol (SOAP) message over hypertext transfer protocol (HTTP).

4. The method of claim 1, wherein the call includes:
    a Session Initiation Protocol (SIP) call;
    a H.323 call;
    a videoconference call, or
    a videophone call.

5. The method of claim 1, wherein the call includes:
    a text messaging call; or
    a voice-over-Internet Protocol (VoIP) call.

6. A device comprising:
    a communication interface to receive messages;
    a skills database that includes a skills schedule table; and
    one or more processors to:
        detect an event based on one of the messages, wherein the messages include one of: a notification of the event from another device or component; or a result of polling the other device or component to detect the event;
        determine, in response to the detection of the event, whether the event satisfies a condition for changing a schedule associated with a particular skill of an agent of a call center, by evaluating a policy or a rule that specifies conditions and actions;
        modify the schedule in the skills schedule table in response to determining that the event satisfies the condition for changing the schedule associated with the particular skill of the agent; and
        send a request, based on the modified schedule associated with the particular skill of the agent, to an automatic call distribution (ACD) device to change, in a database of the ACD device, a list of one or more skills of the agent, record, in the skills database, whether the particular skill of the agent is available to the ACD device, wherein the ACD device receives a call that requires the particular skill for handling the call during scheduled times of the particular skill; selects the agent based on the particular skill of the agent to handle the call; and forwards the call to the agent, wherein the event includes a change in employment status of the agent;

wherein the condition includes one of:
  a promotion of the agent;
  a termination of the agent;
  an employment of the agent; and
  a transfer of the agent from one department to another department, wherein the schedule in the skills database includes for each skill of the list of skills of the agent, times at which the each skill is available for calls to the call center.

7. The device of claim 6, wherein the request includes a call message that invokes an application programming interface (API) for changing the particular skill.

8. The device of claim 7, wherein the call message includes:
  a simple object access protocol (SOAP) message over a hypertext transfer protocol (HTTP).

9. The device of claim 6, wherein the call includes a videoconference call.

10. The device of claim 6, wherein the call includes a text message.

11. A system comprising:
  a skills database that includes a skills schedule table;
  an automatic call distribution (ACD) device for forwarding a call to one of agents in a call center based on skills of the agents and requirements of the call; and
  a device to:
    detect an event by one of:
      polling another device or component to detect the event; and
      receiving a notification of the event from the other device or component;
    determine whether the event satisfies a condition for changing a schedule associated with a particular skill of one of the agents, by evaluating a policy or a rule that specifies conditions and actions;
    modify the schedule in the skills schedule table in response to determining that the event satisfies the condition for changing the schedule associated with the particular skill of the one of the agents;
    record, in the skills database, whether the particular skill of the one of the agents is available to the ACD device, and
    send a request, based on the modified schedule associated with the skill of the one of the agents, to the ACD device to change, in a database of the ACD device, a list of one or more skills of the one of the agents;

wherein the ACD device is further configured to:
  receive the call which requires the particular skill for handling the call during scheduled times of the particular skill;
  select the one of the agents, based on the particular skill of the one of the agents, to handle the call; and
  forward the call to the one of the agents;

wherein the event includes a change in employment status of the one of the agents;

wherein the condition includes one of:
  a promotion of the one of the agents;
  a termination of the one of the agents;
  an employment of the one of the agents; and
  a transfer of the one of the agents from one department to another department, and wherein the schedule in the skills database includes for each skill of the list of skills of the one of the agents, times at which the each skill is available for calls to the call center.

12. The system of claim 11, wherein the call includes:
a Session Initiation Protocol (SIP) call;
a H.323 call;
a videoconference call, or
a videophone call.

13. The system of claim 11, wherein the call includes:
a text message.

14. The system of claim 11, wherein the request includes a call message that invokes an application programming interface (API) for changing the skill.

15. The system of claim 14, wherein the call message includes:
  a simple object access protocol (SOAP) message over a hypertext transfer protocol (HTTP).

* * * * *